(12) United States Patent
Hayami et al.

(10) Patent No.: US 7,729,146 B2
(45) Date of Patent: Jun. 1, 2010

(54) POWER CONVERTER CONTROL AND POWER CONVERSION METHOD

(75) Inventors: Yasuaki Hayami, Yokosuka (JP);
Kraison Throngnumchai, Yokohama (JP); Kentaro Shin, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 301 days.

(21) Appl. No.: 11/863,505

(22) Filed: Sep. 28, 2007

(65) Prior Publication Data
US 2008/0089102 A1     Apr. 17, 2008

(30) Foreign Application Priority Data
Oct. 13, 2006  (JP)  .............. 2006-279929
Jul. 18, 2007   (JP)  .............. 2007-186413

(51) Int. Cl.
H02M 3/24     (2006.01)
H02M 7/5387   (2007.01)
H02P 23/00    (2006.01)

(52) U.S. Cl. .................. 363/98; 363/132; 318/801; 318/807

(58) Field of Classification Search .................. 363/16, 363/17, 56.01, 97, 98, 131, 132; 318/798–803, 318/807–811
See application file for complete search history.

(56) References Cited

U.S. PATENT DOCUMENTS

| | | | |
|---|---|---|---|
| 4,587,605 A | 5/1986 | Kouyama et al. | |
| 4,691,269 A | 9/1987 | Yamane et al. | |
| 4,851,982 A * | 7/1989 | Tanahashi | 363/37 |
| 4,905,135 A * | 2/1990 | Unehara et al. | 363/98 |
| 5,068,777 A | 11/1991 | Ito | |
| 5,155,675 A | 10/1992 | Maruyama et al. | |
| 5,422,557 A * | 6/1995 | Lee et al. | 318/807 |
| 5,467,262 A | 11/1995 | Nakata et al. | |
| 5,627,742 A | 5/1997 | Nakata et al. | |
| 7,042,741 B2 | 5/2006 | Tanaka et al. | |
| 7,102,903 B2 | 9/2006 | Nakamura et al. | |
| 7,282,682 B2 | 10/2007 | Suenaga et al. | |
| 7,542,312 B2 | 6/2009 | Meguro et al. | |
| 2006/0192520 A1 | 8/2006 | Yin et al. | |
| 2006/0221646 A1 | 10/2006 | Ye et al. | |
| 2006/0221656 A1 | 10/2006 | Meguro et al. | |

FOREIGN PATENT DOCUMENTS

| | | |
|---|---|---|
| EP | 0 685 923 A1 | 12/1995 |
| EP | 1 548 923 A | 6/2005 |
| JP | 03-218270 | 9/1991 |
| JP | 4-268 A | 1/1992 |
| JP | 07-099795 | 11/1995 |
| JP | 10-201246 A | 7/1998 |
| JP | 2002-095262 A | 3/2002 |
| JP | 2006-136138 A | 5/2006 |

* cited by examiner

*Primary Examiner*—Matthew V Nguyen
(74) *Attorney, Agent, or Firm*—Young Basile (57) ABSTRACT

A power converter and power conversion method wherein operation of a switching element is controlled by the frequency of a carrier wave where the frequency is varied such that the same frequency of the carrier wave is not repeated during a single modulation period.

18 Claims, 11 Drawing Sheets

| SEQUENCE NUMBER | FREQUENCY VALUE |
|---|---|
| fc(0) | fc1 |
| fc(1) | fc3 |
| fc(2) | fc5 |
| fc(3) | fc7 |
| fc(4) | fc9 |
| fc(5) | fc10 |
| fc(6) | fc8 |
| fc(7) | fc6 |
| fc(8) | fc4 |
| fc(9) | fc2 |

POWER CONVERTER CONTROL AND POWER CONVERSION METHOD

CROSS-REFERENCE TO RELATED APPLICATION

This application claims priority from Japanese Patent Application Serial Nos. 2006-279929, filed Oct. 13, 2006, and 2007-186413, filed Jul. 18, 2007, each of which is incorporated herein in its entirety by reference.

TECHNICAL FIELD

The invention relates to power converters used for motor control and to power conversion methods.

BACKGROUND

There are known power converters that discretely and sinusoidally vary a carrier frequency for pulse-width modulation (PWM) control in order to reduce the electromagnetic noise generated by turning a switch on and off. Thus, the electromagnetic noise can be spread over a wide frequency range, resulting in a reduction in the peak level of the electromagnetic noise. An example of the related art is described in Japanese Unexamined Patent Application Publication No. 7-99795.

BRIEF SUMMARY

In one power converter taught herein, a control unit comprises a command value output unit configured to output a command value, a carrier wave generator configured to generate a carrier wave, a frequency-varying unit configured to discretely and periodically change the frequency of the carrier wave, a control signal generator configured to compare the command value with the carrier wave to generate a control signal, and an output unit configured to produce an output value based on the control signal, wherein the frequency-varying unit varies the frequency of the carrier wave such that a same frequency value of the carrier wave is not repeated during a single modulation period.

Power conversion methods are also taught herein. One such method comprises outputting a command value, generating a carrier wave, changing a frequency of the carrier wave discretely and periodically, comparing the command value to the carrier wave to generate a control signal and outputting a predetermined output value based on the control signal, wherein a frequency value of the carrier wave is not repeated during a single modulation period.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

According to the teachings herein, a carrier frequency is varied such that different frequency values are used when the carrier frequency is increased and when the carrier frequency is decreased in one modulation period. Thus, the carrier frequency is spread, not concentrated at higher harmonic components as in known power converters. Electromagnetic noise is reduced. Embodiments of the invention are next discussed with reference to the drawing figures.

Figure 1:
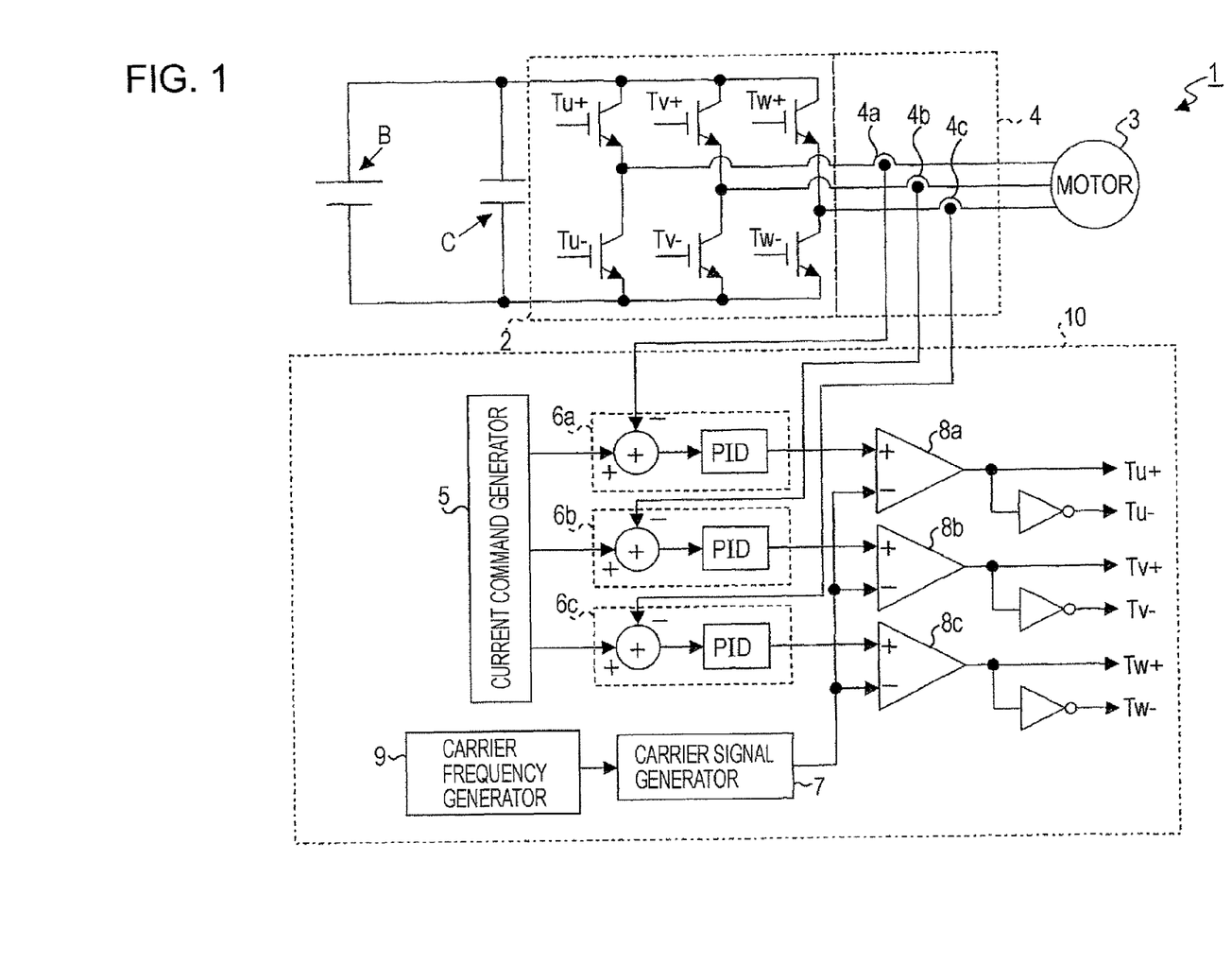
FIG. 1 is a block diagram of a power converter incorporating to a first embodiment of the invention.

As shown in FIG. 1, a power converter 1 incorporating to a first embodiment of the invention includes a PWM inverter 2, a three-phase brushless DC motor (hereinafter, simply referred to as a motor) 3, a current-sensing unit 4 including current sensors 4a, 4b and 4c, a control unit 10, a power source (battery) B and a capacitor C. The control unit 10 includes a current command generator 5, proportional-integral-derivative (PID) controllers 6a, 6b, 6c, a carrier-signal generator 7, comparators 8a, 8b, 8c and a carrier frequency generator 9.

The control unit 10 generally consists of a microcomputer including a central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The components of the control unit 10 described herein could be, for example, implemented in software as the executable programs, or could be implemented in whole or in part by separate hardware in the form of one or more integrated circuits (IC).

The PWM inverter 2 includes six switching elements, Tu+, Tu−, Tv+, Tv−, Tw+ and Tw−, which serve as switches for selectively supplying electric power from the battery B and the capacitor C to the U, V and W phases of the motor 3 in accordance with outputs of the comparators 8a, 8b, and 8c. The switching elements of the PWM inverter 2 are semiconductor elements, such as insulated gate bipolar transistors (IGBTs) or the like.

The current sensors 4a, 4b, 4c sense current values of the U, V and W phases supplied from the PWM inverter 2 to the motor 3. The current command generator 5 generates sinusoidal current command values so that current values sensed by the current sensors 4a, 4b, 4c are converted into sinusoidal AC currents. The PID controllers 6a, 6b, 6c perform feedback control such that the current values sensed by the current sensors 4a, 4b, 4c are equal to the current command values generated by the current command generator 5. Although shown as PID controllers, the controllers 61, 6b, 6c can be otherwise configured as other feedback controllers such as PI, PD, etc.

The carrier frequency generator 9 varies a frequency fc of a carrier signal generated by the carrier signal generator 7 (hereinafter, referred to as a carrier frequency fc). The carrier signal generator 7 outputs a triangular-wave carrier signal having a carrier frequency fc to the comparators 8a, 8b, 8c.

The comparators 8a, 8b, 8c compare values output from the PID controllers 6a, 6b, 6c with the triangular-wave carrier signal provided by the carrier signal generator 7 and provide input signals to the PWM inverter 2 for turning the switching elements Tu+, Tu−, Tv+, Tv−, Tw+, and Tw− of the PWM inverter 2 on and off in accordance with differences obtained by the comparison. As an example, an operation of the comparator Sa for the control of the U-phase switching elements Tu+ and Tu− is described. When a value output from the PID controller 6a is larger than the triangular-wave carrier signal provided by the carrier signal generator 7, the comparator 8a turns on the switching element Tu+ and turns off the switching element Tu− so that a positive voltage is applied to the U phase of the motor 3. When the value output from the PID controller 6a is smaller than the triangular-wave carrier signal, the comparator 8a turns off the switching element Tu+ and turns on the switching element Tu− so that a negative voltage is applied to the U phase of the motor 3.

Figure 2:
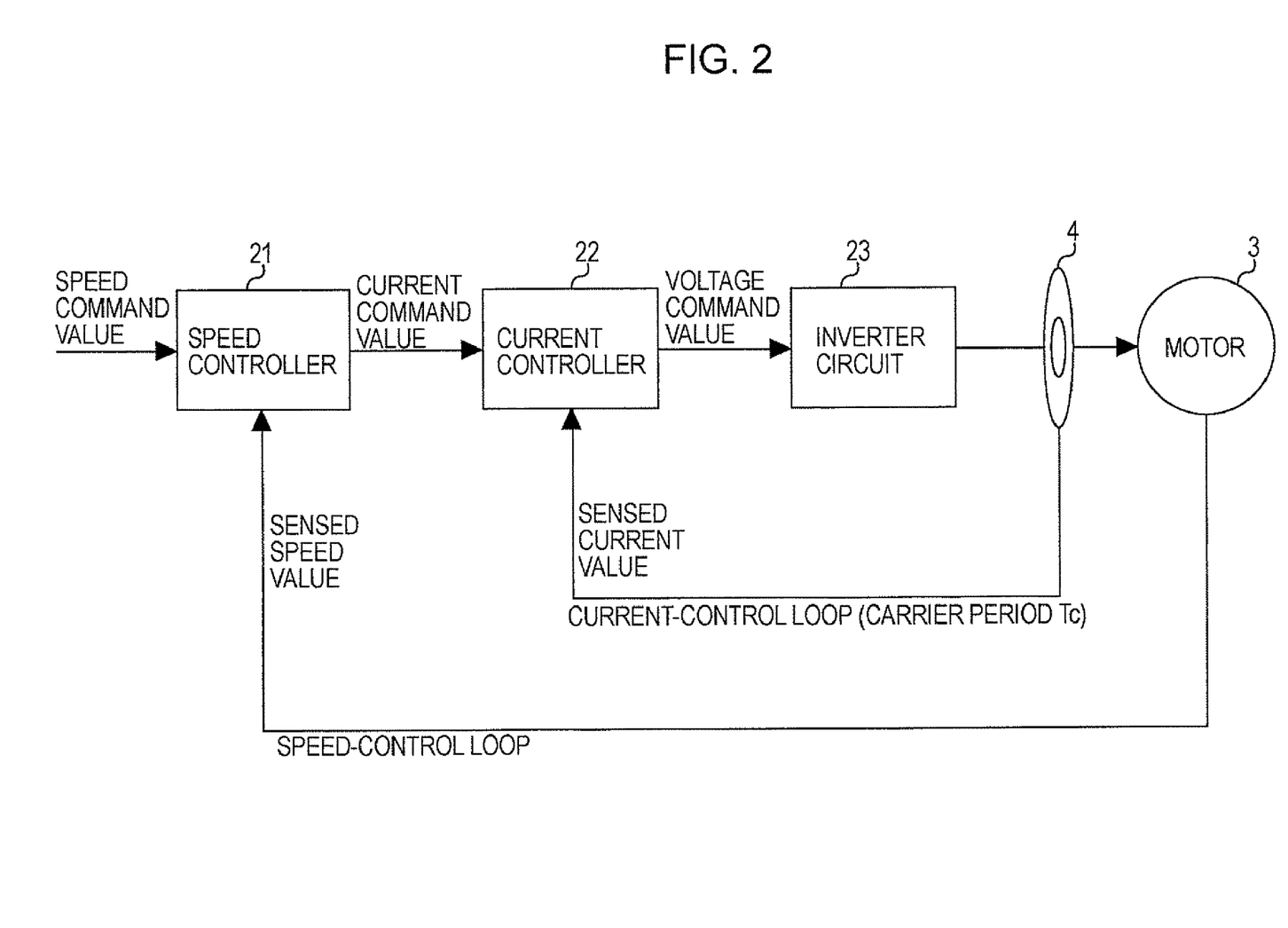
FIG. 2 is a control block diagram of the power converter of FIG. 1.

FIG. 2 is a control block diagram showing additional details of the power converter 1 shown in FIG. 1. The power converter I includes the motor 3, the current-sensing unit 4 including the current sensors 4a, 4b, 4c, a speed controller 21, a current controller 22 and an inverter circuit 23. The speed controller 21 calculates a current command value based on a speed command value and a sensed speed value of the motor 3 under the PID control. The current controller 22 generates a voltage command value based on the current command value and a current value sensed by the current-sensing unit 4. The current controller 22 includes the PID controllers 6a, 6b, 6c. The inverter circuit 23 turns on or off a switching element in accordance with the voltage command value generated by the controller 22 and outputs three-phase AC power to the motor 3. The inverter circuit 23 includes the carrier signal generator 7, the comparators 8a, 8b, 8c, the carrier frequency generator 9 and the PWM inverter 2.

Also shown in FIG. 2 are a current-control loop and a speed-control loop. In the current-control loop, a current supplied from the inverter circuit 23 to the motor 3 in accordance with a voltage command value, which is output from the current controller 22 in accordance with a current command value and a sensed current value, is sensed, and the sensed current value is input to the current controller 22. In the speed-control loop, the rotational speed of the motor 3 driven via the current-control loop in accordance with the current command value, which is output from the speed controller 21 in accordance with a speed command value and a sensed speed value, is sensed, and the sensed speed value is input to the speed controller 21. A period of the current-control loop is the same as a period Tc of a carrier signal generated by the carrier signal generator 7 (hereinafter, referred to as a carrier period Tc). A carrier period Tc is the reciprocal of the carrier frequency fc. Thus, a duration time T (see FIG. 3) of each discrete value of the carrier frequency fc cannot be shorter than the carrier period Tc.

Figure 3:
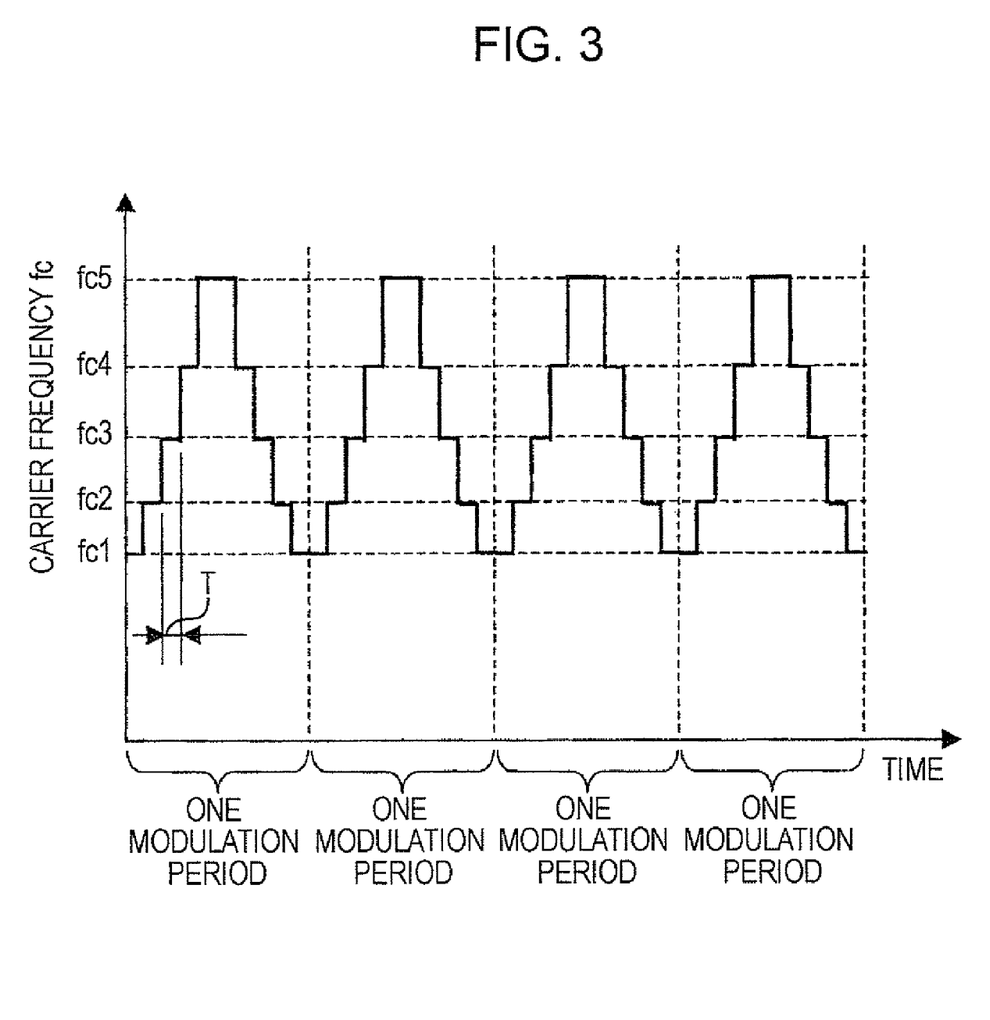
FIG. 3 shows the temporal variation of a carrier frequency under digital control in the related art.
Figure 4:
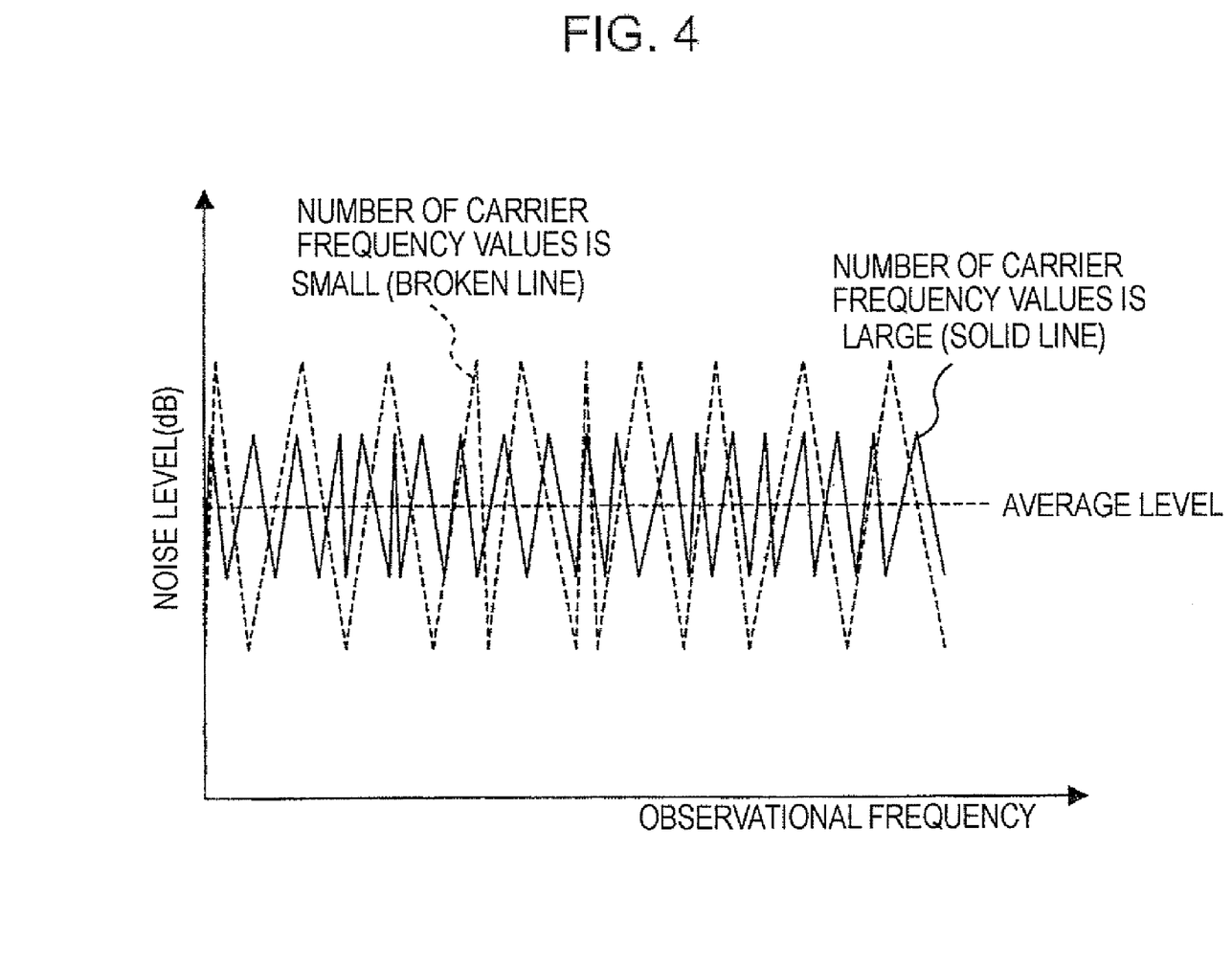
FIG. 4 is a graph comparing the noise generated when the number of carrier frequency values is small to the noise generated when the number of carrier frequency values is large.

The temporal variation of the carrier frequency fc in the first embodiment is now described. FIG. 3 shows a temporal variation of a carrier frequency fc under digital control in the related art during four modulation periods. FIG. 4 is a graph comparing the noise generated when the number of carrier frequency values is small to the noise generated when the number of carrier frequency is small.

As shown in FIG. 3, by temporally varying a carrier frequency fc in a periodic manner, spectral components exhibiting high noise levels generated at an mth-order harmonic frequency m·fc of a predetermined carrier frequency fc can be spread over an mth-order frequency range (for example, m·fc1 to m·fc5) of a frequency range (for example, fc1 to fc5 in FIG. 3) of a temporal variation of the carrier frequency fc. Thus, the peak level of noise can be reduced.

However, in a temporal variation of a carrier frequency fc under digital control, only discrete values are used. Thus, when a low number of values of the carrier frequency fc are used, the noise energy is not sufficiently spread over the mth-order frequency range from m·fc1 to m·fc5. Rather, the noise energy is concentrated at the mth-order frequencies of the discrete carrier frequency values fc1, fc2, fc3, fc4 and fc5, that is, concentrated at m·fc1 m·fc2, m·fc3, m·fc4 and m·fc5. Thus, the peak level of noise cannot be sufficiently reduced, as represented by the crests of the broken line in FIG. 4. This is because the sum of the noise levels generated in the mth-order frequency range from m·fc1 to m·fc5 of the frequency range from fc1 to fc5 (that is, the sum of the noise energy) does not vary irrespective of whether or not the carrier frequency fc is temporally varied.

In the temporal variation of the carrier frequency fc shown in FIG. 3, frequency values other than the discrete carrier frequency values fc1, fc2, fc3, fc4 and fc5 are not used. Thus, the noise level for mth-order frequencies of frequencies other than fc1, fc2, fc3, fc4 and fc5 is reduced as represented by the troughs of the broken line in FIG. 4.

A minimum possible peak level is achieved when the sum of the noise energy is evenly spread over the mth-order frequency range from m·fc1 to m·fc5. In this case, the noise energy level would be constant over time and equal to the average level shown in FIG. 5, since the sum of the noise energy remains constant. Therefore, the peak noise level would be minimized if the carrier frequency fc were temporally varied in a continuous manner in the frequency range from fc1 to fc5. Accordingly, by increasing the number of discrete values of the carrier frequency fc used when temporally varying the carrier frequency fc, the peak noise level is moves toward the average noise level, thereby resulting in a reduction in the peak level.

In order to increase the number of values of the carrier frequency fc, the duration time T (see FIG. 3) of each value of the carrier frequency fc may be shortened. However, as described above, the duration time T cannot be shorter than the carrier period Tc, which is the reciprocal of the carrier frequency fc. Alternatively, one temporal variation period (hereinafter, referred to as one modulation period) of the carrier frequency fc may be lengthened so that the number of values of the carrier frequency fc can be increased. However, if a modulation period is lengthened, beat noise typically occurs. For example, since the difference between an amplitude-modulation (AM) radio broadcast carrier wave and an mth-order harmonic frequency m·fc of the carrier frequency fc is slowly varied, the difference between the AM radio broadcast carrier wave and the mth-order harmonic frequency m·fc of the carrier frequency fc is heard as a variation of sound corresponding to the temporal variation of the carrier frequency fc, that is, as beat noise, which is offensive to human ears.

Figure 5:
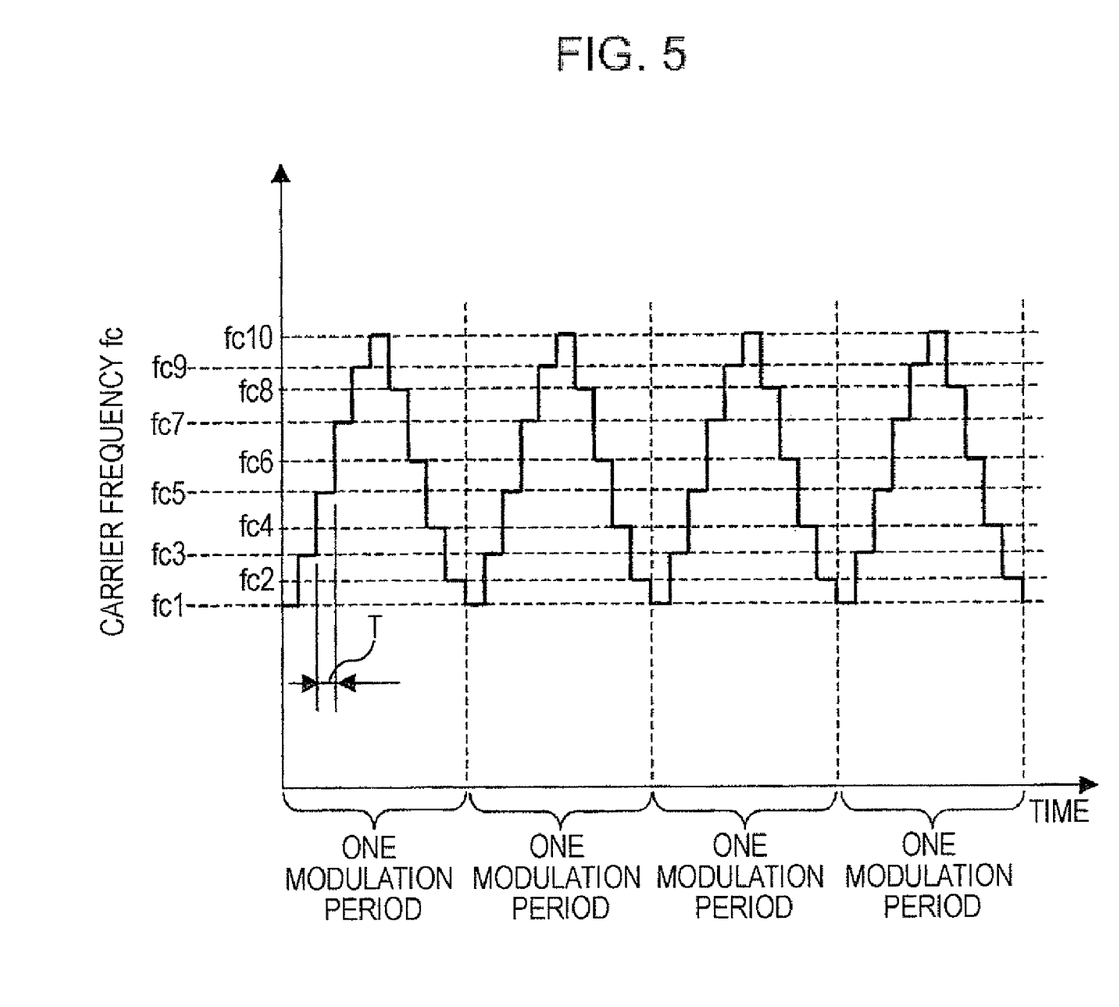
FIG. 5 shows the temporal variation of a carrier frequency according to the first embodiment of the invention.

In light of the foregoing, the power converter according to the first embodiment temporally varies the carrier frequency fc such that different frequency values exist when the carrier frequency fc is increased as opposed to when the carrier frequency is decreased during one modulation period. Referring to FIG. 5, which shows the temporal variation of the carrier frequency fc over four modulation periods, ten different values from the minimum value fc1 to the maximum value fc10 are used as values of the carrier frequency fc. The carrier frequency fc is increased from the minimum value fc1 using the odd-numbered frequency values (that is, fc1, fc3, fc5, fc7 and fc9) in ascending order, and the carrier frequency fc is decreased from the maximum value fc10 using the even-numbered frequency values (that is, fc2, fc4, fc6, fc8 and fc10) in descending order. In this manner, the carrier frequency fc is varied gradually, rather than abruptly, as abrupt variation of the carrier frequency fc may affect the control characteristic or other characteristics of the power converter 1. Thus, impacts on the control characteristic and other characteristics of the power converter 1, such as a current variation (current ripple), can be suppressed.

Figure 6A:
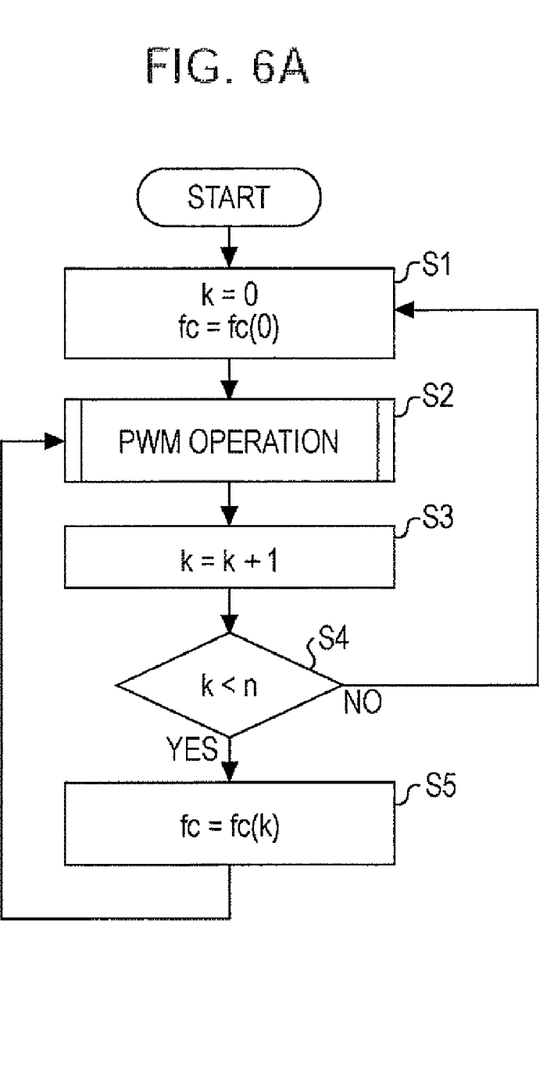
FIG. 6A is a flowchart showing the process by which the temporal variation of the carrier frequency shown in FIG. 5 is achieved.
Figure 6B:
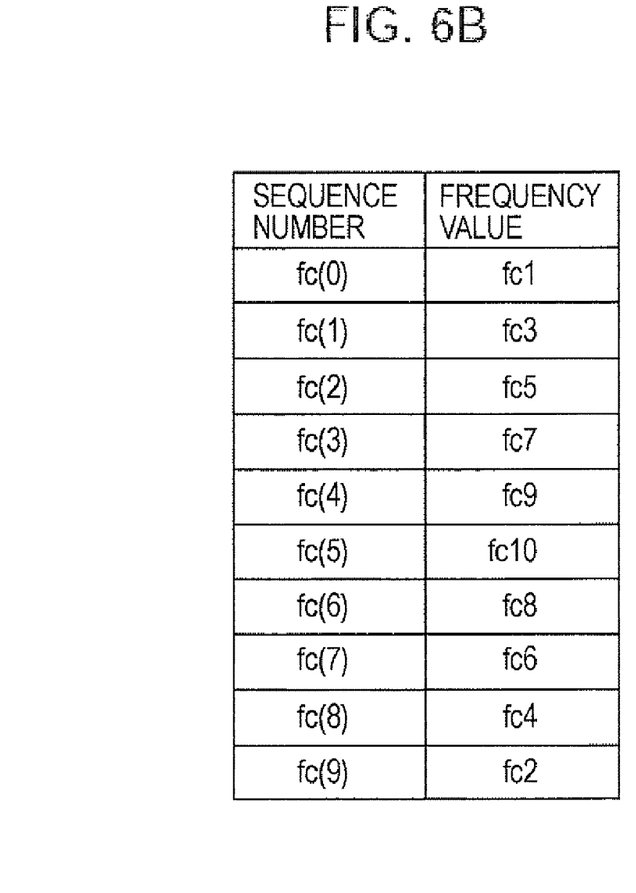
FIG. 6B is a table showing a frequency map of sequence numbers and corresponding frequency values used in the process of FIG. 6A.

FIG. 6A is a flowchart showing the process by which the temporal variation of the carrier frequency fc shown in FIG. 5 is produced. FIG. 6B is a table showing a frequency map of sequence numbers and corresponding frequency values used in the process of FIG. 6A.

The frequency map shown in FIG. 6B is a database in which the frequency values fc1, fc2, fc3, fc4, fc5, fc6, fc7, fc8, fc9 and fc10 are stored in advance in association with sequence numbers fc(0) to fc(9) representing an order of the temporal variation of the carrier frequency fc when the values of the carrier frequency fc used in the second embodiment are arranged in ascending order. As shown in FIG. 6B, in the order from the sequence numbers fc(0) to fc(9), the frequency values fc1, fc3, fc5, fc7 and fc9 used when the carrier frequency fc increases and the frequency values fc10, fc8, fc6, fc4 and fc2 used when the carrier frequency fc decreases are stored.

In the process by which the temporal variation of the carrier frequency fc is produced, an initial count value k of a counter is set to 0, as shown in FIG. 6A. Thus, in step S1, as a value of the carrier frequency fc, a frequency value fc1 whose sequence number is fc(0) is set. Then, in step S2 PWM operation is executed using the frequency value fc1, and in step S3 the count value k is incremented by 1. Next, in step S4 it is determined whether the count value k is smaller than the number of values of the carrier frequency fc, that is, the number n of values in the arrangement of the frequency map. If in step S4 it is determined that the count value k is smaller than the number n, a frequency value corresponding to the sequence number fc(k) is read in step S5 as a value of the carrier frequency fc from the frequency map shown in FIG. 6B. Then, the process returns to the control processing of step S2, and PWM operation is executed using the frequency value corresponding to the sequence number fc(k). Then, the control processing of steps S2 to S5 is repeatedly performed. Accordingly, the carrier frequency fc is varied from the frequency value fc1, which corresponds to the sequence number fc(0), to the frequency value fc2, which corresponds to the sequence number fc(9).

In contrast, if it is determined in step S4 that the count value k is equal to or larger than the number n of values in the arrangement of the frequency map, the process returns to step S1 and the count value k is set to 0. Then, the frequency value to whose sequence number is fc(0) is set in step S1. Accordingly, the carrier frequency fc is varied such that the same value does not exist over a period of time exceeding a predetermined duration time T that is no shorter than a carrier period Tc when the carrier frequency fc is increased and when the carrier frequency fc is decreased. Thus, the temporal variation of the carrier frequency fc shown in FIG. 5 with an increased number of values of the carrier frequency fc per modulation period can be automatically achieved.

A power converter 1 according to a second embodiment of the invention is now described with reference to FIGS. 7 to 9. In the second embodiment, like elements are referred to by the same reference numerals used in the first embodiment, and those parts are as described in the first embodiment. However, temporal variation of the carrier frequency fc performed by the carrier frequency generator 9 of the control unit 10 of the second embodiment differs from the temporal variation of the carrier frequency fc performed by the carrier frequency generator 9 of the control unit 10 of the first embodiment. In particular, control unit 10 of the second embodiment differs from the control unit 10 of the first embodiment in that the control process is performed without a frequency map.

Figure 7:
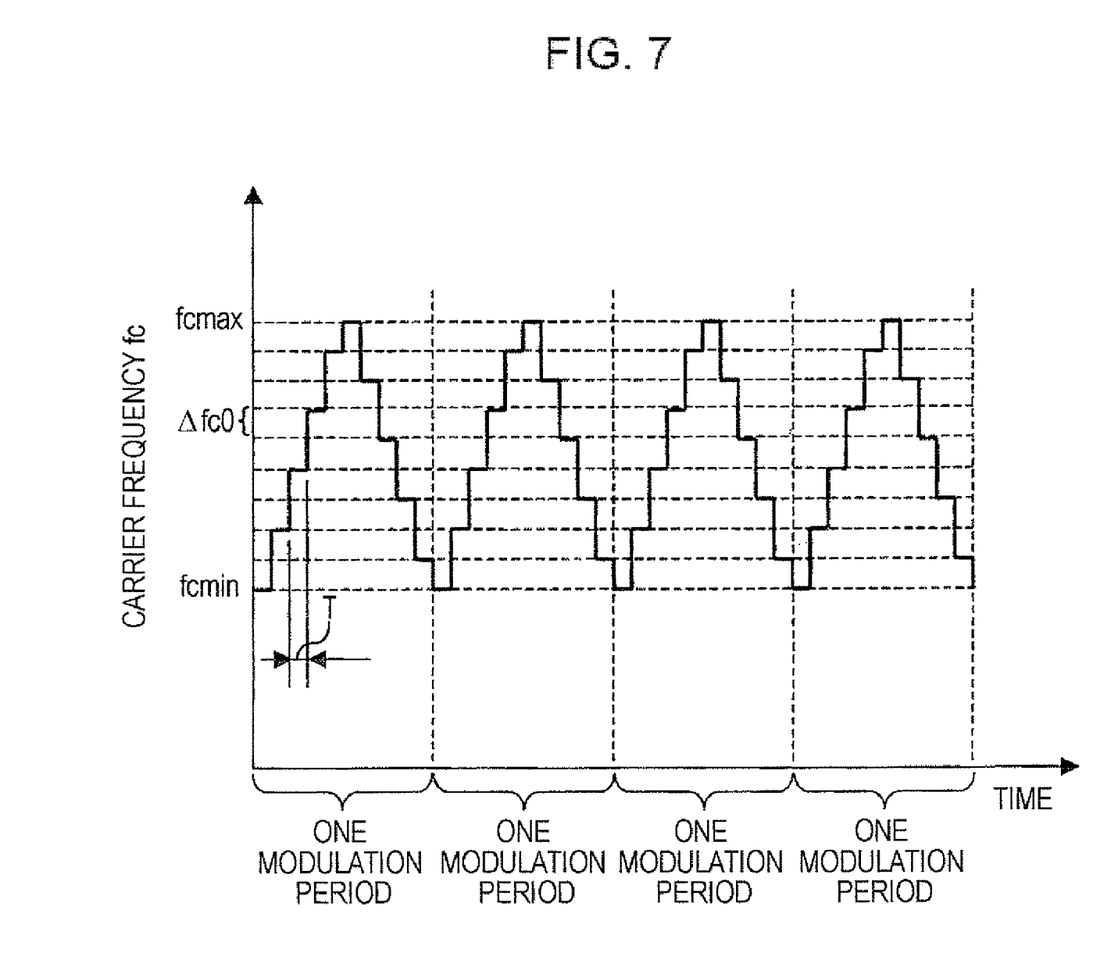
FIG. 7 shows the temporal variation of a carrier frequency according to a second embodiment of the invention.

FIG. 7 shows a temporal variation of a carrier frequency in the second embodiment over four modulation periods. As in the first embodiment, ten different values from the minimum value fcmin to the maximum value fcmax are used as values of a carrier frequency fc. As described above, the power converter according to the second embodiment does not use a frequency map. Thus, the ten values of the carrier frequency fc are calculated on the basis of the minimum value fcmin and the maximum value fcmax. More specifically, a predetermined frequency difference $\Delta fc0$, the minimum value fcmin and the maximum value fcmax are set in advance. The carrier frequency fc is discretely increased to a value fca, which is obtained by the calculation of fcmin+i×2$\Delta fc0$ where i=1, 2, etc. In addition, after the condition fca=fcmin+i×2$\Delta fc0$>fcmax is met, the carrier frequency fc is discretely decreased to a value obtained by the calculation of fca−(j+½)×2$\Delta fc0$ where j=0, 1, etc. When the number of values of the carrier frequency fc is represented by n (n is an integer), the frequency difference $\Delta fc0$ is represented by the equation $\Delta fc0$=(fcmax−fcmin)/(n−1). Thus, when j is 0, the carrier frequency fc exhibits the maximum value fcmax. Then, when the condition fca−(j+½)×2$\Delta fc0$=fcmax−j×2$\Delta fc0$<fcmin is met, the carrier frequency fc is set to the minimum value fcmin. Thus, as shown in FIG. 7, when the carrier frequency fc is temporally varied between the maximum value fcmax and the minimum value fcmin, an abrupt variation can be suppressed. Thus, the result achieved in the second embodiment is similar to the result achieved in the first embodiment.

Figure 8:
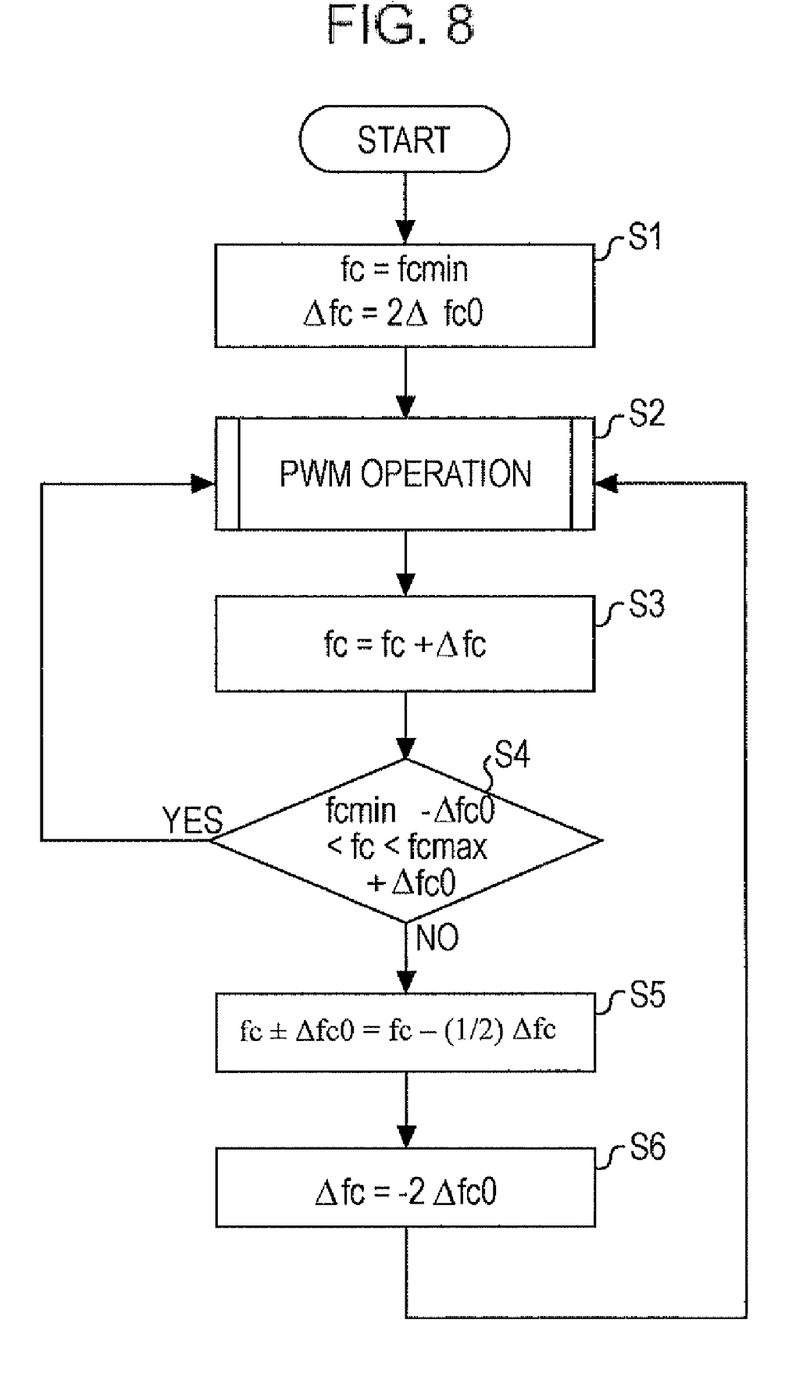
FIG. 8 is a flowchart showing the process by which the temporal variation of the carrier frequency shown in FIG. 7 is produced.

FIG. 8 is a flowchart showing a process to achieve the temporal variation of the carrier frequency fc shown in FIG. 7. The second embodiment differs from the first embodiment in that a frequency map is not used, thus simplifying the control unit 10. In the process by which the temporal variation of the carrier frequency fc in the second embodiment is produced, an initial value of the carrier frequency fc is set to the minimum value fcmin in step S1, as shown in FIG. 8. Also in step S1, a difference $\Delta fc$ between the initial value of the carrier frequency fc and the next value of the carrier frequency fc is set to a value twice a predetermined frequency difference $\Delta fc0$. Then, PWM operation is executed using the minimum value fcmin in step S2. Next, the difference $\Delta fc$ is added to the value of the carrier frequency fc in step S3. Since $\Delta fc$ is equal to 2$\Delta fc0$, the value of the carrier frequency fc is represented as fcmin+2$\Delta fc0$. In step S4 it is determined whether the value of the carrier frequency fc is larger than fcmin−$\Delta fc0$ and smaller than fcmax+$\Delta fc0$. If it is determined in step S4 that the value of the carrier frequency fc is larger than fcmin−$\Delta fc0$ and smaller than fcmax+$\Delta fc0$, the process returns to step S2, and PWM operation is executed using the value fcmin+2$\Delta fc0$ of the carrier frequency fc. Furthermore, until the determination in step S4 changes, steps s2 to S4 are performed repeatedly with updated values for fc.

If, however, it is determined in step S4 that the value of the carrier frequency fc is equal to or larger than fcmax+Δfc0, the process proceeds to step S5 where the value of the carrier frequency fc is set to a value satisfying the equation fc−(½)Δfc=fc−Δfc0. Here, (½)Δfc=Δfc0 is subtracted from the value of the carrier frequency fc. This is because by varying the value of the carrier frequency fc by Δfc0, different values can be used when the carrier frequency fc is increased and when the carrier frequency fc is decreased. Then, in step S6 the sign of the difference Δfc between the value of the carrier frequency fc and the next value of the carrier frequency fc is inverted. Thus, the temporal increase of the carrier frequency fc is changed to a temporal decrease. Then, the process returns to step S2, and PWM operation is executed using the value of the carrier frequency fc. The control processing of steps S2 to S4 is repeatedly performed. Thus, the value of the carrier frequency fc is decreased by 2Δfc0. Then, when it is determined in step S4 that the value of the carrier frequency fc is equal to or smaller than fcmin−Δfc0, the value of the carrier frequency fc is set to a value satisfying the equation fc−(½)Δfc=fc+Δfc0 in step S5. In this manner, the carrier frequency fc is returned to the minimum value fcmin. Then, the sign of the difference Δfc between the value of the carrier frequency fc and the next value of the carrier frequency fc is inverted in step S6. Thus, the temporal decrease of the carrier frequency fc is changed to a temporal increase, signaling the start of the next modulation period.

By using the process of FIG. 8, unlike the first embodiment, a frequency map is not used. Thus, the control unit 10 need not provide a storage medium wherein a frequency map may be stored, such as a semiconductor memory. Thus, the control unit 10 may be simplified. In addition, when the carrier frequency fc is increased and decreased, the carrier frequency fc is discretely varied by a frequency twice the predetermined frequency difference Δfc0. Only when a frequency increase is changed to a frequency decrease or when a frequency decrease is changed to a frequency increase, is the carrier frequency fc varied by the predetermined frequency difference Δf0. Thus, each value of the carrier frequency fc can be automatically calculated by a simple calculation.

Figure 9:
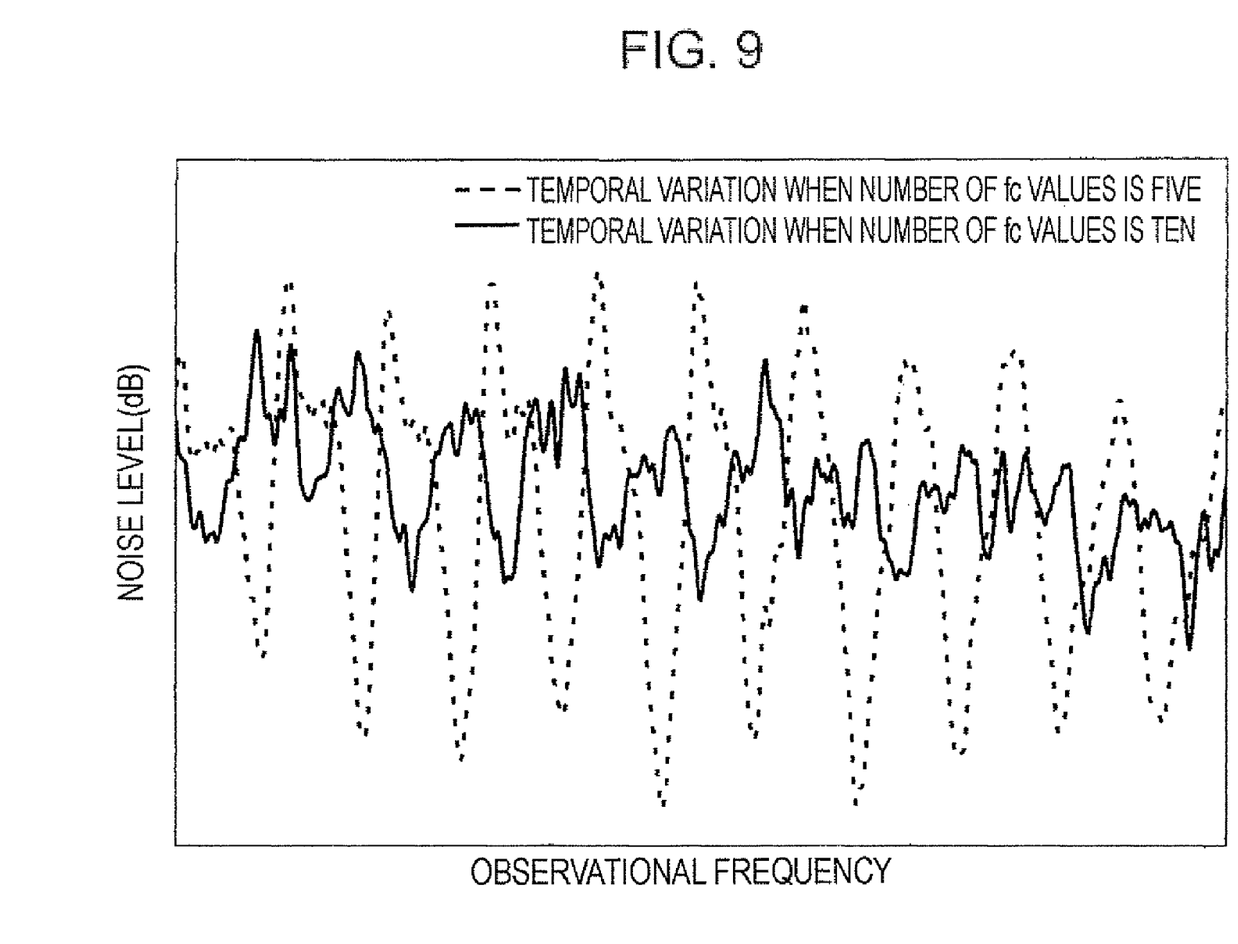
FIG. 9 is a graph comparing the noise generated when the number of carrier frequency values is five to the noise generated when the number of carrier frequency values is ten.

FIG. 9 is a graph of empirical data comparing the noise generated when the number of carrier frequency values fc is five to the noise generated when the number of carrier frequency values fc is 10. When the carrier frequency fc is varied in a triangular wave form, and the number of values of the carrier frequency fc is five, the same values are used when the carrier frequency fc is increased and when the carrier frequency fc is decreased as shown in FIG. 3. In contrast, when the number of values of the carrier frequency fc is ten, the carrier frequency fc may be varied such that the same value does not exist over a period of time exceeding a predetermined duration time T, which is no shorter than a carrier period Tc in which the carrier frequency fc is increased and subsequently decreased as shown in FIG. 8. Thus, as shown in FIG. 9, as the number of values of the carrier frequency fc increases, the peak noise level decreases.

Figure 10:
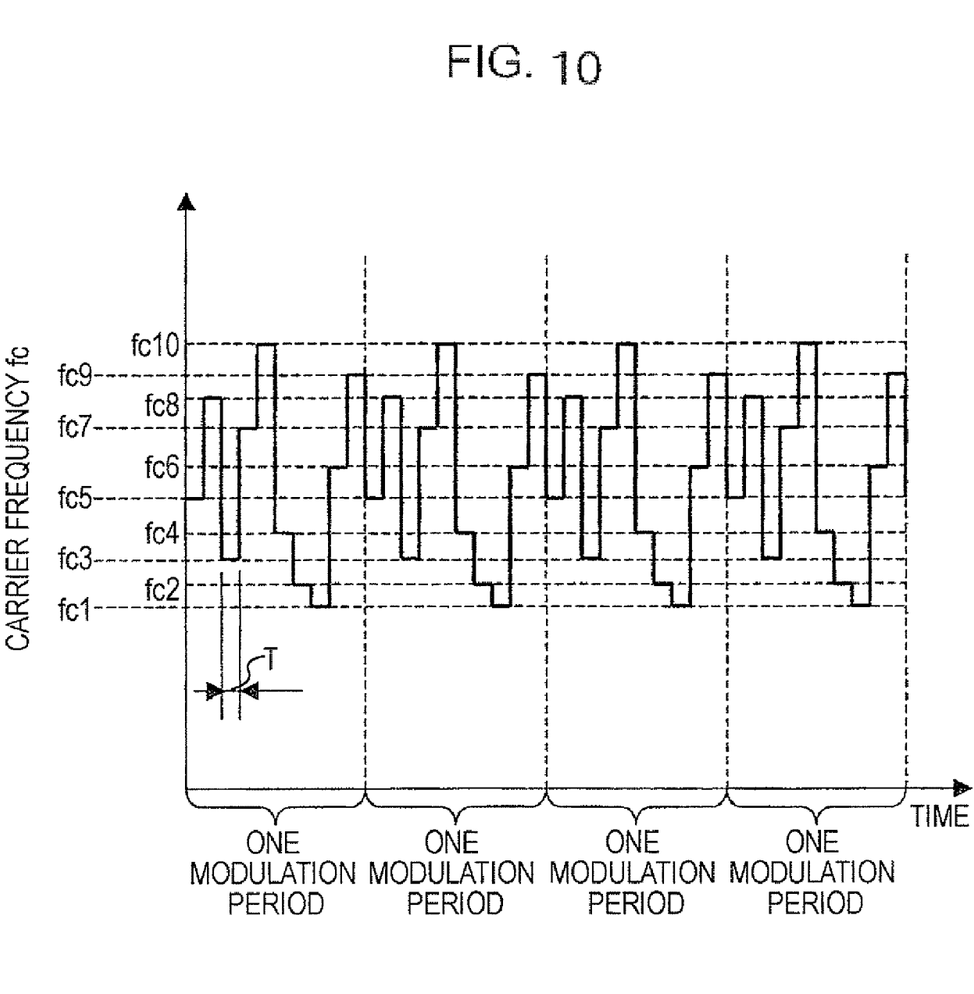
FIG. 10 shows the temporal variation of a carrier frequency according to a third embodiment of the invention.

Although it is taught in the first and second embodiments that abrupt changes in the carrier frequency fc may be avoided, it should be appreciated that such is not necessary, and a reduction of the peak noise level may still be obtained by temporally varying the carrier frequency fc such that the same value is not repeated during a modulation period. In particular, FIG. 10 shows the temporal variation of the carrier frequency fc in the third embodiment of the invention wherein the carrier frequency fc temporally varied such that different frequency values exist when the carrier frequency fc is increased and when the carrier frequency is decreased in one modulation period.

More specifically, in the third embodiment ten different values fc1 to fc10 are used as values of a carrier frequency fc. Each of the values fc1 to fc10 of the carrier frequency fc is used only once in each modulation period. Thus, spectral components exhibiting high noise levels, generated by turning on or off a switching element, for an mth-order harmonic frequency m·fc of the carrier frequency fc can be spread over mth-order frequencies of the discrete values fc1, fc2, fc3, fc4, fc5, fc6, fc7, fc8, fc9 and fc10 of the carrier frequency fc, that is, spread over the frequencies m·fc1, m·fc2, m·fc3, m·fc4, m·fc5, m·fc6, m·fc7, m·fc8, m·fc9, and m·fc10. Thus, the peak level of noise can be reduced as indicated by the crests of the solid line in FIG. 9. The total sum of reciprocals for the carrier frequency fc used in a modulation period is set so as to be shorter than the modulation period.

As described above, in the third embodiment a carrier frequency fc is varied such that different frequency values exist when a carrier period is increased and when the carrier period is decreased. Thus, the number of frequency values per modulation period can be increased without lengthening a modulation period, which is a temporal variation period, of the carrier frequency fc or without shortening a duration time T. Thus, the peak level of the noise can be reduced.

It should be understood that although the description herein refers to odd numbered frequency values and even numbered frequency values, the terms odd and even refer to the position of each frequency in order and not to the magnitude of the frequency itself. For example, when eight values, 2 kHz, 19 kHz, 6 kHz, 9 kHz, 11 kHz, 13 kHz, 17 kHz and 5 kHz, of a carrier frequency are used, these values are arranged in ascending order according to magnitude, that is, in the order of 2 kHz, 5 kHz, 6 kHz, 9 kHz, 11 kHz, 13 kHz, 17 kHz and 19 kHz. Thus, when the carrier frequency is increased, the odd- numbered values in the arrangement (6 kHz, 2 kHz, 11 kHz and 17 kHz) are used. When the carrier frequency is decreased, the even-numbered values in the arrangement (9 kHz, 5 kHz, 19 kHz and 13 kHz) are used.

Of course, if the frequency values are arranged in ascending order according to magnitude, the frequency may be increased or decreased by stepping through the odd or even values in order, as appropriate. For example, in a case where the above-described frequency values are used, the frequency values vary in the order of 2 kHz, 6 kHz, 11 kHz and 17 kHz when the carrier frequency is increased, and the frequency values vary in the order of 19 kHz, 13 kHz, 9 kHz and 5 kHz when the carrier frequency is decreased.

Each of the above-described embodiments is merely an aspect of the present invention. The scope of the present invention is not limited to any of the above-described embodiments. The invention can be incorporated into a number of applications such as electric power steering or the like, or in any case where a reduction in switching noise is desirable. Various changes and modifications can be made to the present invention without departing from the scope of the claims. With respect to the selection of frequencies, for example, a number of methods have been shown to select those frequencies. The selection of frequencies is not limited thereby. The different frequencies should be, however, selected within a range acceptable to a device. For example, when a device is capable of varying a frequency over a range from 15 kHz to 25 kHz, frequency value of 16 kHz, 18 kHz, 19 kHz, 21 kHz, 22 kHz and 23 kHz can be selected. Also, the total sum of the reciprocals of the frequency values should be less than or equal to one modulation period Tm.

Figure 11:
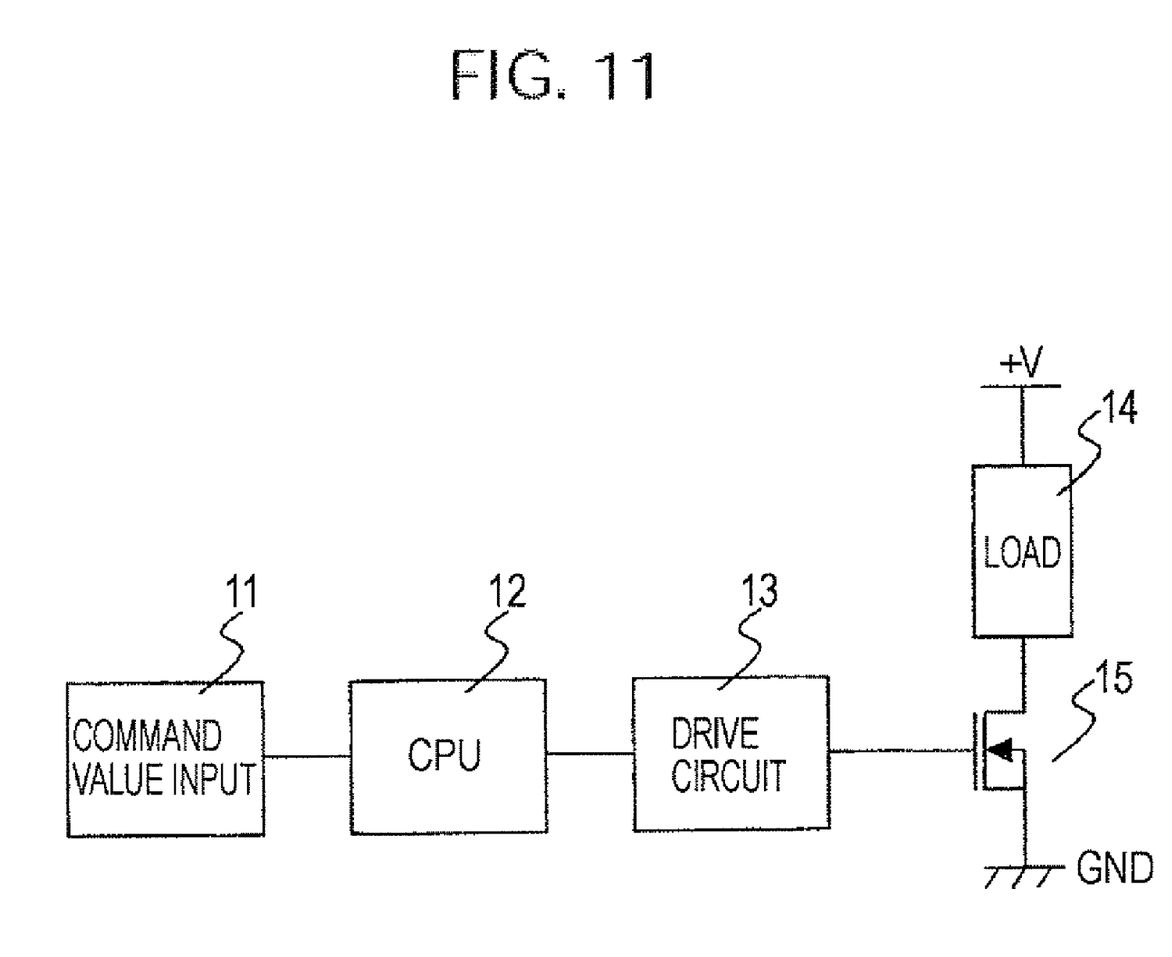
FIG. 11 is a block diagram showing load driving using a simple switch.

Other changes are also possible. In the first through third embodiments, for example, the power converter system 1 is an inverter system that includes a PWM inverter 2 that PWM-modulates an output of a DC power source and supplies sinusoidal AC power to the motor 3. However, the present invention is not limited to the power converter system 1. When the present invention is applied to other systems in which the mode of power is changed by switching, an advantage similar to that achieved by the use of the power converter system 1 can be achieved. For example, a motor may be driven with an H-bridge configuration. Alternatively, as shown in FIG. 11 the invention may be applied to a configuration including a central processing unit (CPU) 12 that outputs a carrier signal whose carrier frequency has been varied in accordance with a signal of a command value input 11, a drive circuit 13 that outputs to a simple switch 15 a switching signal controlling the turning on and off of the switch 15 and a load 14 to which a voltage is applied from a voltage source +V by a turning on/off operation of the switch 15.

In the first embodiment, a carrier frequency fc is increased from the minimum value fc1 in an order such that odd-numbered frequency values (that is, fc1, fc3, fc5, fc7 and fc9) in the arrangement in which the values of the carrier frequency fc are arranged in ascending order are used. In addition, the carrier frequency fc is decreased from the maximum value fc10 in an order such that even-numbered frequency values (that is, fc2, fc4, fc6, fc8 and fc10) in the arrangement are used. However, the invention is not limited to using odd number frequency values when the carrier frequency fc is increased and even numbered frequency values when the carrier frequency fc is decreased. For example, the even-numbered frequency values can be used when the carrier frequency fc is increased, and the odd-numbered frequency values can be used when the carrier frequency fc is decreased.

In the first embodiment, the relationships between the frequency values fc1, fc2, fc3, fc4, f5, fc6, fc7, fc8, fc9 and fc10 of the frequency map are not described. However, differences between the frequency values may be the same.

In the second embodiment, the predetermined frequency difference $\Delta fc0$ is represented as $(fcmax-fcmin)/(n-1)$. However, the predetermined frequency difference $\Delta fc0$ is not limited to this. The predetermined frequency difference $\Delta fc0$ may be set to a desired value.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A power converter control unit, comprising:
a command value output unit configured to output a command value;
a carrier wave generator configured to generate a carrier wave;
a frequency-varying unit configured to discretely and periodically change the frequency of the carrier wave;
a control signal generator configured to compare the command value with the carrier wave to generate a control signal; and
an output unit configured to produce an output value based on the control signal;
wherein the frequency-varying unit is further configured to vary the frequency of the carrier wave such that a frequency value of the carrier wave is not repeated during a single modulation period.

2. The power converter according to claim 1 wherein a plurality of frequency values is arranged in ascending or descending order according to magnitude; and wherein the frequency-varying unit is further configured to select the frequency of the carrier wave from odd numbered values of the plurality of frequency values when increasing the frequency of the carrier wave and to select the frequency of the carrier wave from even numbered values of the plurality of frequency values when decreasing the frequency of the carrier wave.

3. The power converter according to claim 1 wherein a plurality of frequency values is arranged in ascending order according to magnitude; and wherein the frequency-varying unit is further configured to increase the frequency of the carrier wave by selecting odd numbered values of the plurality of frequency values in sequence from lowest frequency to highest frequency and to decrease the frequency of the carrier wave by selecting even numbered values of the plurality of frequency values in sequence from highest frequency to lowest frequency.

4. The power converter according to claim 3 wherein differences between adjacent even numbered values and differences between adjacent odd numbered values are equal.

5. The power converter according to claim 1 wherein a plurality of frequency values is arranged in ascending or descending order according to magnitude; and wherein the frequency-varying unit is further configured to select the frequency of the carrier wave from the even numbered values of the plurality of frequency values when increasing the frequency of the carrier wave and to select the frequency of the carrier wave from the odd numbered values of the plurality of frequency values when decreasing the frequency of the carrier wave.

6. The power converter according to claim 5 wherein differences between adjacent even numbered values and differences between adjacent even numbered values are equal.

7. The power converter according to claim 1 wherein a minimum value of the frequency of the carrier wave is represented by fcmin, a maximum value of the frequency of the carrier wave is represented by fcmax, and a predetermined frequency difference is represented by $\Delta fc0$; and wherein the frequency-varying unit is further configured to increase the frequency of the carrier wave from fcmin to fcmax by discrete steps equal to a lesser of $2\Delta fc0$ or a difference between the frequency of the carrier wave and fcmax, and to decrease the frequency of the carrier wave from fcmax to fcmin by discrete steps equal to a lesser of $2\Delta fc0$ or a difference between the frequency of the carrier wave and fcmin.

8. A power converter control unit, comprising:
means for outputting a command value;
means for generating a carrier wave;
frequency changing means for discretely and periodically changing the frequency of the carrier wave;
means for comparing the command value with the carrier wave to generate a control signal; and
means for producing an output value based on the control signal;
wherein the frequency-changing means further comprises means for varying the frequency of the carrier wave such that a frequency value of the carrier wave is not repeated during a single modulation period.

9. A power conversion method, comprising:
outputting a command value;
generating a carrier wave;

changing a frequency of the carrier wave discretely and periodically;

comparing the command value to the carrier wave to generate a control signal;

outputting a predetermined output value based on the control signal, wherein a frequency value of the carrier wave is not repeated during a single modulation period; and arranging a plurality of frequency values in ascending or descending order according to magnitude; and wherein changing the frequency of the carrier wave further includes:

selecting the frequency of the carrier wave from one of odd numbered values and even numbered values of the plurality of frequency values when increasing the frequency of the carrier wave; and selecting the frequency of the carrier wave from the other of the even numbered values and the odd numbered values of the plurality of frequency values when decreasing the frequency of the carrier wave.

10. The power conversion system according to claim 9 wherein differences between adjacent even numbered values and differences between adjacent even numbered values are equal.

11. A power conversion method, comprising:
outputting a command value;
generating a carrier wave;
changing a frequency of the carrier wave discretely and periodically;
comparing the command value to the carrier wave to generate a control signal;
outputting a predetermined output value based on the control signal, wherein a frequency value of the carrier wave is not repeated during a single modulation period; and
arranging a plurality of frequency values in ascending order according to magnitude; and wherein changing the frequency of the carrier wave further includes:
increasing the frequency of the carrier wave by selecting odd numbered values of the plurality of frequency values in sequence from lowest frequency to highest frequency; and
decreasing the frequency of the carrier wave by selecting even numbered values of the plurality of frequency values in sequence from highest frequency to lowest frequency.

12. The power conversion system according to claim 11 wherein differences between adjacent even numbered values and differences between adjacent even numbered values are equal.

13. A power conversion method, comprising:
outputting a command value;
generating a carrier wave;
changing a frequency of the carrier wave discretely and periodically;
comparing the command value to the carrier wave to generate a control signal; and
outputting a predetermined output value based on the control signal, wherein a frequency value of the carrier wave is not repeated during a single modulation period; and
wherein a minimum value of the frequency of the carrier wave is represented by fcmin, a maximum value of the frequency of the carrier wave is represented by fcmax, and a predetermined frequency difference is represented by $\Delta fc0$; and wherein changing the frequency of the carrier wave further comprises:
increasing the frequency of the carrier wave from fcmin to fcmax by discrete steps equal to the lesser of $2\Delta fc0$ or the difference between the frequency of the carrier wave and fcmax; and
decreasing the frequency of the carrier wave from fcmax to fcmin by discrete steps equal to the lesser of $2\Delta fc0$ or the difference between the frequency of the carrier wave and fcmin.

14. The power converter control unit according to claim 8, further comprising:
means for arranging a plurality of frequency values in ascending or descending order according to magnitude; and wherein the means for varying the frequency of the carrier wave such that the frequency value of the carrier wave is not repeated during a single modulation period comprises:
means for selecting the frequency value of the carrier wave from the even numbered values of the plurality of frequency values when increasing the frequency of the carrier wave and for selecting the frequency value of the carrier wave from the odd numbered values of the plurality of frequency values when decreasing the frequency of the carrier wave; or
means for selecting the frequency value of the carrier wave from the odd numbered values of the plurality of frequency values when increasing the frequency of the carrier wave and for selecting the frequency value of the carrier wave from the even numbered values of the plurality of frequency values when decreasing the frequency of the carrier wave.

15. The power converter control unit according to claim 14 wherein differences between adjacent even numbered values and differences between adjacent even numbered values are equal.

16. The power converter according to claim 1 wherein a total sum of reciprocals for frequency values of the carrier wave used during the single modulation period is less than a length of the single modulation period.

17. The power converter according to claim 1 wherein a duration time of each frequency value of the carrier wave is equal to or greater than a carrier period that is a reciprocal of the frequency value.

18. The power converter according to claim 2 wherein differences between adjacent even numbered values and differences between adjacent odd numbered values are equal.

* * * * *